United States Patent [19]

Brandt

[11] Patent Number: 5,004,094
[45] Date of Patent: Apr. 2, 1991

[54] APPARATUS FOR TRANSPORTING STACKS OF PAPER SHEETS TO PROCESSING MACHINES

[75] Inventor: Eckhard Brandt, Norderstedt, Fed. Rep. of Germany

[73] Assignee: E.C.H. Will GmbH, Hamburg, Fed. Rep. of Germany

[21] Appl. No.: 36,001

[22] Filed: Apr. 8, 1987

[30] Foreign Application Priority Data

Apr. 10, 1986 [DE] Fed. Rep. of Germany ....... 3612021

[51] Int. Cl.$^5$ .............................................. B65G 47/26
[52] U.S. Cl. ...................................................... 198/460
[58] Field of Search ............................... 198/460–462, 198/425, 419.2

[56] References Cited

U.S. PATENT DOCUMENTS

| 3,403,772 | 10/1968 | Vadas | 198/425 |
| 4,040,512 | 8/1977 | Ness | 198/460 |
| 4,120,393 | 10/1978 | Motooka et al. | 198/460 |
| 4,230,218 | 10/1980 | Kunzmann | 198/461 |
| 4,440,288 | 4/1984 | Thomas et al. | 198/460 |
| 4,518,075 | 5/1985 | Aykut et al. | 198/460 |
| 4,629,058 | 12/1986 | Reissmann et al. | 198/460 |

FOREIGN PATENT DOCUMENTS 2805036 8/1979 Fed. Rep. of Germany ...... 198/460

*Primary Examiner*—Joseph E. Valenza
*Attorney, Agent, or Firm*—Peter K. Kontler

[57] ABSTRACT

Apparatus for advancing singularized stacks of paper sheets to a packing machine has an intermittently driven first conveyor which receives groups of abutting stacks at required or fixed intervals and overlaps in part with a continuously or intermittently driven gathering conveyor wherein successive groups are caused to form a continuous row. Successive foremost stacks of the row are taken over by a singularizing conveyor which moves the stacks apart and delivers them cyclically to the packing machine. The gathering conveyor has several sections which are disposed one behind the other in the direction of transport of stacks toward the singularizing conveyor and which can be lifted, individually or jointly, into engagement with stacks above them or lowered below the level of the first conveyor so that the latter can advance the stacks in a direction toward the singularizing conveyor. Detectors are provided to operate cylinder and piston units which raise or lower the sections of the gathering conveyor so that a section is lowered if it is not disposed below a stack or below a set of several stacks. The sections are lifted when the first conveyor is arrested upon completed advancement of a group into the range of the gathering conveyor.

22 Claims, 3 Drawing Sheets

APPARATUS FOR TRANSPORTING STACKS OF PAPER SHEETS TO PROCESSING MACHINES

BACKGROUND OF THE INVENTION

The invention relates to improvements in apparatus for transporting stacks of sheets or like commodities to a processing machine, particularly for transporting stacks of paper sheets to a packing machine. Still more particularly, the invention relates to improvements in apparatus of the type disclosed in commonly owned U.S. Pats. Nos. 4,518,075 to Aykut et al. and 4,629,058 to Reissmann et al.

The patents to Aykut et al. and Reissmann et al. disclose apparatus wherein a first conveyor receives groups of abutting stacks of paper sheets from a stack accumulating and group assembling station, a gathering or condensing conveyor which converts successive groups into a continuous row, and a singularizing conveyor which advances successive foremost stacks of the row toward the processing machine in such a way that the stacks are spaced apart from each other and can enter the processing machine at required intervals, i.e., so that the machine receives a stack during the optimum stage of the respective cycle. The patents further disclose that the gathering conveyor can comprise a plurality of individual conveyors which are operated in such a way that they reduce the gaps between successive groups of stacks in order to form the aforementioned row of abutting stacks which are thereupon singularized prior to entering the processing machine. The speed of the singularizing conveyor exceeds the speed of conveyors which together form the gathering conveyor.

OBJECTS AND SUMMARY OF THE INVENTION

An object of the invention is to provide an apparatus which constitutes an improvement over and a further development of apparatus disclosed in the patents to Aykut et al. and Reissmann et al.

Another object of the invention is to provide a novel and improved gathering or condensing conveyor for use in the above outlined apparatus.

A further object of the invention is to provide novel and improved means for controlling the operation of the first and gathering conveyors in the above outlined apparatus.

An additional object of the invention is to provide a novel and improved method of converting regularly or irregularly delivered groups of stacks of paper sheets or analogous commodities into a row which can be broken up into a file of uniformly spaced-apart commodities for admission into a processing machine.

Still another object of the invention is to provide a production line, e.g., for making and stacking sheets and for wrapping stacked sheets, which embodies the above outlined apparatus.

A further object of the invention is to provide a novel and improved set of belt or chain conveyors which can be used in the condensing or gathering conveyor of the above outlined apparatus.

One feature of the invention resides in the provision of an apparatus for delivering discrete commodities to a processing machine, for example, for delivering spaced-apart stacks of overlapping paper sheets, plastic sheets or the like to a packing machine. The apparatus comprises a first conveyor which serves to receive groups of commodities from a commodity assembling and/or transporting unit and to advance the groups in a predetermined direction along a predetermined path wherein the commodities of a group are located one behind the other, first prime mover means for (preferably discontinuously, i.e., intermittently) driving the first conveyor, and a condensing or gathering conveyor which occupies a predetermined portion of the path and serves to convert the groups of commodities into a row of normally closely adjacent (especially abutting) commodities and to advance the row in the predetermined direction. The gathering conveyor comprises a plurality of sections which are disposed one behind the other in the predetermined direction, cylinder and piston units or other suitable means for moving the sections between first positions at a first level in which the commodities in the predetermined portion of the path are out of contact with the sections and second positions at a different second level in which the commodities in the predetermined portion of the path rest on the respective sections, and second prime mover means for (preferably continuously) driving the sections in the predetermined direction. The apparatus further comprises singularizing conveyor means which serves to receive successive commodities of the row on the gathering conveyor and to advance the received commodities in substantially uniformly spaced-apart positions toward or directly into the processing machine.

Each section of the gathering conveyor can comprise at least one discrete conveyor (e.g., an endless belt or chain conveyor), and the second prime mover means can comprise a discrete prime mover for the discrete conveyor(s) of each section. Alternatively, the gathering conveyor can comprise at least one endless belt or chain conveyor and the sections include portions of such endless conveyor. The second prime mover means can comprise means for continuously driving the endless conveyor or conveyors of the gathering conveyor.

The second level is normally disposed above the first level, i.e., the moving means is designed to lift the sections from the second to the first level and to lower the sections from the second to the first level.

In accordance with a presently preferred embodiment, the first conveyor includes at least one first endless belt or chain conveyor and the gathering conveyor comprises one or more second endless belt or chain conveyors. The endless conveyors of the first and gathering conveyors are disposed side by side, as seen transversely of the predetermined direction, i.e., the endless conveyor or conveyors of the first conveyor extend into the predetermined portion of the path. The endless conveyors of the first and gathering conveyors are preferably narrow endless belt conveyors. At least a portion of the endless conveyor or conveyors of the gathering conveyor extends to a level (preferably only slightly) above the endless conveyor(s) of the first conveyor in the second position of at least one section of the gathering conveyor.

As mentioned above, the second prime mover means can comprise a discrete prime mover for each section of the gathering conveyor. The arrangement may be such that the discrete prime movers are operative to drive the respective sections in the predetermined direction only in the second positions of such sections, i.e., only when the sections actually contact commodities in the predetermined portion of the path. For example, the discrete prime movers can be operated to drive the respective sections in automatic response to operation of the corresponding moving means in a sense to lift the sections to their second positions.

The means for operating the moving means can include signal generating means for monitoring the occupancy of the sections by commodities (i.e., whether or not one or more commodities are in contact with the adjacent section or sections). The moving means are responsive to signals from the monitoring means to move the respective sections from their second to their first positions when the sections are not occupied. The monitoring means can include optoelectronic detector means.

The first prime mover means can comprise a variable-speed electric or other motor, and the apparatus can further comprise first encoder means which is preferably operatively connected with the second prime mover means to generate first signals at a first frequency which is proportional to the speed of the sections, second encoder means which is preferably operatively connected with the (preferably intermittently driven) first prime mover means to generate second signals at a second frequency which is proportional to the speed of the first conveyor, and control means for varying the speed of the motor of the first prime mover means as a function of differences between the first and second frequencies. The control means can include means for comparing the first and second frequencies and for generating third signals which denote the difference between the first and second frequencies. Such control means further comprises RPM regulator means which is responsive to third signals and serves to vary the RPM of the motor.

The control means can further include means for increasing the speed of the motor so as to move the foremost commodity of a group on the first conveyor toward the predetermined portion of the path and to locate the foremost commodity at a predetermined distance from the rearmost commodity of the previously received and advanced group. The just mentioned distance can be zero or a whole multiple (including one) of the length of a commodity in the path (as measured in the predetermined direction). Each group normally comprises a predetermined number of commodities (e.g., a file of three abutting commodities), and the apparatus can further comprise means for directly or indirectly monitoring the groups and for influencing the control means when the number of commodities in a group which is received by the first conveyor is less than the predetermined number so that the aforementioned whole multiple then equals the combined length of commodities which are missing from a group on the first conveyor. The monitoring means can include means for ascertaining segregation or lack of segregation of defective commodities from a group ahead of the first conveyor.

Each signal from the first encoder means can be indicative of movement of a section through a predetermined distance (in the predetermined direction), and each signal from the second encoding means can be indicative of movement of the first conveyor (in the predetermined direction) through such predetermined distance.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain presently preferred embodiments with reference to the accompanying drawing.

DESCRIPTION OF THE PREFERRED EMBODIMENTS

Figure 1:
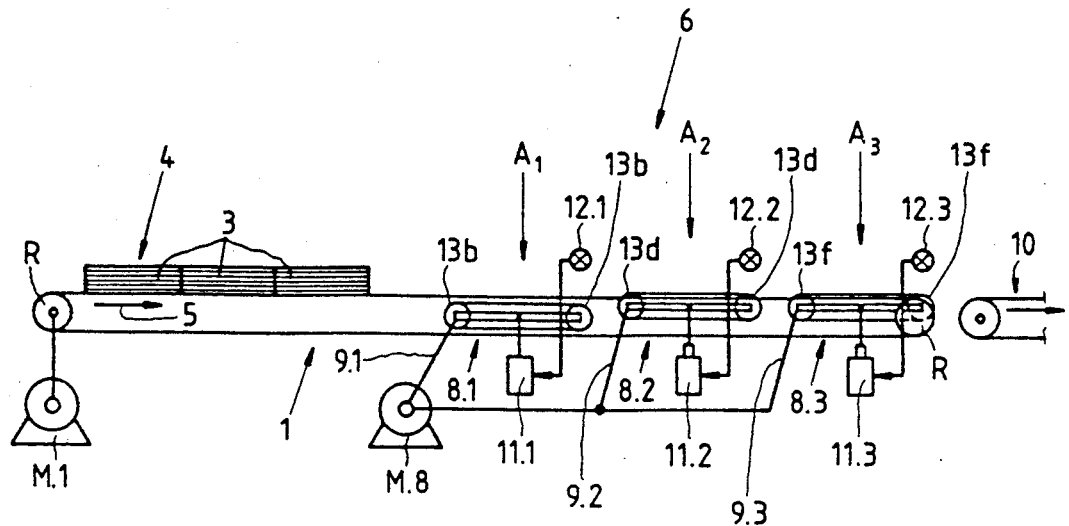
FIG. 1 is a fragmentary schematic side elevational view of an apparatus which embodies one form of the invention and wherein each section of the gathering conveyor comprises two discrete endless belt conveyors.
Figure 2:
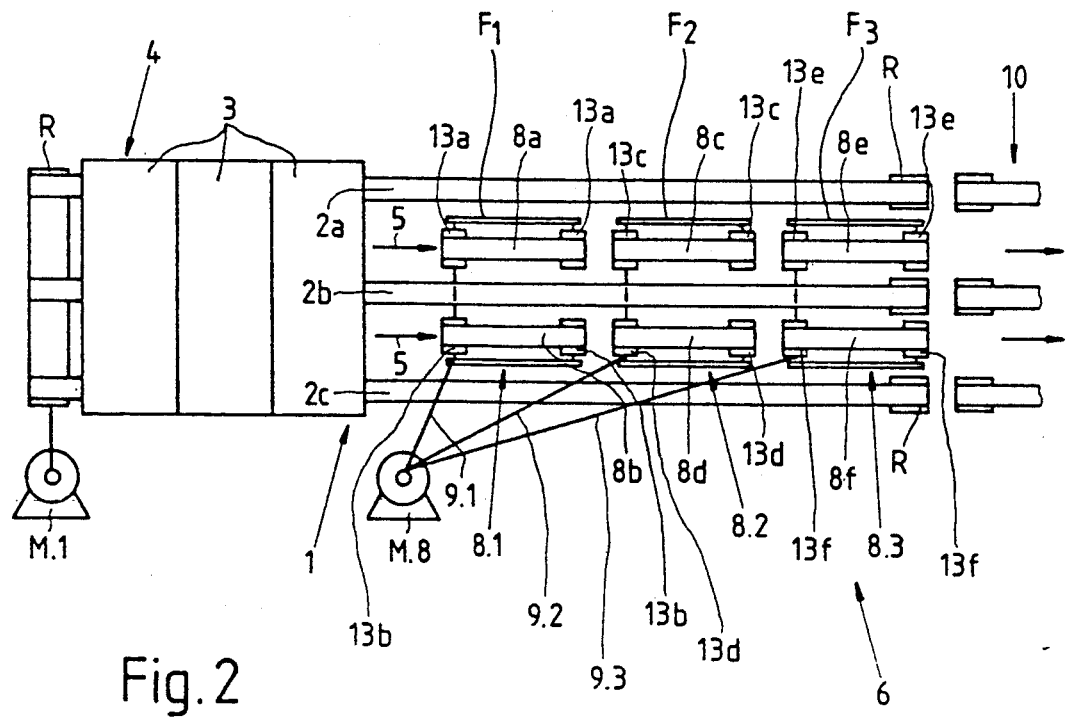
FIG. 2 is a plan view of the apparatus which is shown in FIG. 1.

Referring first to FIGS. 1 and 2, there is shown an apparatus wherein a first conveyor 1 overlaps in part with a condensing or gathering conveyor 6 and the latter is disposed ahead of a singularizing conveyor 10. The first conveyor 1 comprises three preferably identical endless belt conveyors 2a, 2b, 2c which are trained over pulleys R and can be intermittently driven by a first prime mover means including a constant-speed or variable-speed electric motor M.1. The motor M.1 can drive the upper reaches or stretches of the belt conveyors 2a–2c in directions which are indicated by arrows 5 to advance groups 4 of three abutting stacks 3 of paper sheets each into that portion of the path defined by the conveyor 1 which is adjacent the gathering conveyor 6. Successive groups 4 of normally three abutting stacks 3 each are delivered to the conveyor 1 from above or from one side, i.e., upwardly or downwardly as seen in FIG. 2.

The purpose of the gathering conveyor 6 is to condense successive groups 4 so that the foremost stack 3 of a trailing group 4 abuts or is immediately adjacent the rearmost stack 3 of the preceding group 4, i.e., the stacks of two or more groups form a single row of parallel and preferably abutting stacks. Successive foremost stacks 3 of such row are accepted by the trailing end of the singularizing conveyor 10 which moves each freshly accepted stack 3 away from the next-following stack so that the processing machine 51 (see FIG. 5), e.g., a packing machine, receives a succession of discrete stacks 3 in substantially uniformly spaced apart positions, one during each cycle of the machine to ensure that the machine can operate in an optimum way. The gathering conveyor 6 receives motion from a second prime mover means M.8, e.g., a constant-speed electric motor, and the singularizing conveyor 10 (which can comprise three identical endless belt or chain conveyors as shown in FIG. 2) can be driven by a further prime mover means (not specifically shown) at a speed which suffices to ensure that each freshly accepted stack 3 is moved away from the next-following stack, i.e., that the rearmost stack on the conveyor 10 moves away from the foremost stack on the conveyor 6.

The gathering conveyor 6 defines in a predetermined portion of the path for movement of stacks 3 from the leftmost portion of the first conveyor 1 toward the singularizing conveyor 10 a gathering or condensing station which includes three portions or zones $A_1$, $A_2$ and $A_3$ disposed one behind the other as seen in the direction of arrows 5 and respectively accommodating sections 8.1, 8.2 and 8.3 of the gathering conveyor. Each section of the gathering conveyor 6 comprises two endless belt conveyors (8a, 8b in the section 8.1, 8c, 8d in the section 8.2 and 8e, 8f in the section 8.3) which are disposed in two parallel vertical planes alternating with the planes of the endless belt conveyors 2a-2c of the first conveyor 1. It is clear that the number of belt conveyors which form part of the first conveyor 1 can be increased or reduced and that the number of groups of conveyors as well as the number of endless belt conveyors in each of the groups can be increased or reduced without departing from the spirit of the invention. By way of example, the first conveyor 1 can comprise only two endless belt or chain conveyors, and each section of the gathering conveyor 6 can comprise three endless belt or chain conveyors alternating with the endless conveyors of the first conveyor. As can be seen in FIG. 2, the endless belt conveyors 8a-8f of the sections 8.1 to 8.3 are disposed side-by-side with the conveyors 2a-2c of the first conveyor 1 so that a stack 3 or a group or row of two, three or more stacks can rest on the endless belt conveyors 2a-2c or on the belt conveyors of one or more groups. The belt conveyors 8a, 8c, 8e form a first file between the belt conveyors 2a, 2b, and the belt conveyors 8b, 8d, 8f form a second file between the belt conveyors 2b, 2c. The belt conveyors 8a-8f are respectively trained over pairs of pulleys 13a, 13b, 13c, 13d, 13e and 13f. The pulleys 13a and 13b for the conveyors 8a, 8b of the section 8.1 are mounted in a first frame $F_1$, the pulleys 13c, 13d for the conveyors 8c, 8d of the second section 8.2 are mounted in a second frame $F_2$, and the pulleys 13e, 13f for the conveyors 8e, 8f of the third section 8.3 (as seen in the direction of arrow 5) are mounted in a third frame $F_3$. The frames $F_1$ to $F_3$ can be moved up and down, either jointly or independently of each other.

The operative connections between the output element of the motor M.8 for the gathering conveyor 6 and the rear pulleys 13a-13b, 13c-13d and 13e-13f are respectively shown schematically at 9.1, 9.2 and 9.3. These operative connections can include chain or belt transmissions or any other suitable torque transmitting means. For all practical purposes, each of these connections can be said to constitute a discrete prime mover for the respective section of the gathering conveyor 6.

The means for moving the frames $F_1$, $F_2$ and $F_3$ between first positions at a lower level (in which the respective sections 8.1 to 8.3 are out of contact with the stacks 3, if any, thereabove) and second positions at a higher level (in which the upper reaches of the respective endless belt conveyors 8i-8b, 8c-8d and/or 8e-8f support the adjacent stack or stacks 3 from below) comprises discrete hydraulic or pneumatic cylinder and piston units 11.1, 11.2 and 11.3 which are shown schematically in FIG. 1. FIG. 1 shows the frame $F_1$ in its first position (at the lower level) and the frames $F_2$ and $F_3$ in their second positions (at the upper level). Thus, one or more stacks 3 above the endless belt conveyors 8a, 8b in zone $A_1$ of the gathering station) ret on the upper reaches of the belt conveyors 2a-2c but any stack or stacks in the zone $A_2$ and/or $A_3$ rest on the upper reaches of the belt conveyors 8c, 8d and/or 8e, 8f because such upper reaches are disposed at a level above the upper reaches of adjacent portions of the conveyors 2a-2c. The difference between the levels of upper reaches of the conveyors 8a-8f and the level of the upper reaches of the conveyors 2a-2c in raised or second positions of the respective frames $F_1$ to $F_3$ can be small or very small, as long as it suffices to ensure that a stack 3 is supported and can be advanced by one or more sections of the gathering conveyor 6 when one or more frames are caused to assume their second positions. The conveyors 8a-8f are or can be driven at a constant speed and without interruptions, i.e., regardless of the positions of the respective frames, and the speed of these conveyors in the direction of arrows 5 is less than the speed of the conveyors 2a-2c so that the gathering conveyor 6 moves one or more stacks 3 (namely the stacks on the conveyors of one or more sections 8.1 to 8.3) relative to the stack or stacks which continue to be supported by the conveyors 2a-2c of the first conveyor 1 only when the conveyor 1 is idle.

The means for operating the moving means 11.1-11.3 comprises means 12.1, 12.3 and 12.3 for monitoring the occupancy of the sections 8.1-8.3 of the gathering conveyor 6, i.e., for ascertaining whether or not the zones $A_1$ to $A_3$ of the gathering station contain any sections 3. The monitoring means 12.1 to 12.3 include photoelectronic detectors whose transducers generate signals which are used to operate the respective moving means 11.1 to 11.3 in a sense to lower the respective sections 8.1. to 8.3 when the corresponding zones $A_1$, $A_2$, $A_3$ do not contain one or more stacks 3, i.e., to move the upper reaches of the respestive endless belt conveyors 8a-8b, 8c-8c, 8e-8f to a level below the level of the upper reaches of the belt conveyors 2a-2c forming part of the first conveyor 1. The exact details of the means for operating the moving means 11.1 to 11.3 can be similar to those of the operating means which are disclosed in the patent to Aykut et al. except that the operating means are used to effect a movement of the sections 8.1 to 8.3 to upper or lower levels instead of changing the speed of the respective sections in a manner as disclosed by Aykut et al. In other words, instead of engaging or disengaging clutches which are disclosed by Aykut et al., the operating means (including the photoelectronic detectors 12.1 to 12.3 of the present invention) is used to actuate the cylinder and piston unit 11.1, 11.2 and/or 11.3 in a sense to move the respective frame $F_1$, $F_2$ and/or $F_3$ from the upper level to the lower level whenever the respective zone $A_1$, $A_2$ and/or $A_3$ of the gathering station is not occupied by one or more stacks 3. Aykut et al. teach that, under analogous circumstances, the operating means should reduce the speed of the gathering conveyor.

The mode of operation of the apparatus which is shown in FIGS. 1 and 2 is as follows:

When the delivery of a group 4 of three abutting stacks 3 onto the left-hand portion of the first conveyor 1 is completed, the motor M.1 is started to advance the belt conveyors 2a-2c and the group 4 thereon in the direction of arrows 5, i.e., toward the first section 8.1 of the gathering conveyor 6. The stack or stacks 3 on the gathering conveyor 6 (i.e., the stack or stacks of the preceding group 4) are moved toward the left-hand end portion of the singularizing conveyor at a speed which is less than the speed of the endless belt conveyors which form part of the conveyor 10. The motor M.8 drives only the belt conveyors of that group or those groups of the gathering conveyor 6 which are disposed below one or more stacks 3; the remaining section or sections of the conveyor 6 are held in their lower positions under the action of the respective monitoring means 12.1, 12.2 and/or 12.3. Thus, the moving means 11.1, 11.2 and/or 11.3 automatically lowers the respective section of the conveyor 6 when the associated monitoring means detects that the corresponding zone $A_1$, $A_2$ and/or $A_3$ of the gathering station is not occupied by one or more stacks 3. The speed of the belt conveyors 2a-2c (when the motor M.1 is in operation) exceeds the speed of the belt conveyors of the gathering conveyor 6 so that the leading edge of the group 4 of stacks 3 on the belt conveyors 2a-2c advances toward and ultimately catches up with the trailing edge of the preceding group 4, i.e., such groups form a row of four, five or six abutting stacks 3 which advance toward the singularizing conveyor 10. Thus, the width of the gap between the rearmost (fresly delivered) and the immediately preceding groups 4 is reduced, normally to zero, not later than when the foremost stack 3 of the rearmost group 4 advances into the range of the conveyor 10.

The belt conveyors 2a-2c of the first conveyor 1 are arrested as soon as the foremost stack 3 of the rearmost group 4 reaches and abuts the rearmost stack of the preceding group. The conveyor 1 is then ready to receive a fresh group 4 which is preferably delivered thereto at right angles to the directions indicated by arrows 5, i.e., from above or from below as seen in FIG. 2. The stacks 3 of the file which contains three, four or more abutting stacks are then transported by the sections 8.1 to 8.3 of the gathering conveyor 6; the belt conveyors of the sections 8.1 to 8.3 are lifted (by the moving means 11.1 to 11.3) simultaneously with stoppage of the first conveyor 1.

The first conveyor 1 is set in motion again as soon as it has received a fresh group 4 of three neighboring stacks 3, and such freshly received group is transported in the direction of arrows 5 at a speed which exceeds the speed of the sections 8.1 to 8.3 so that the freshly delivered group catches up with the last stack 3 of the preceding group on the gathering conveyor 6 and forms therewith the rear part of the aforediscussed row of abutting stacks. At such time, at least the belt conveyors 8a-8b of the section 8.1 are idle because the monitoring means 12.1 maintains the respective moving means 11.1 in a position corresponding to the lower position of the respective frame $F_1$. This is due to the signal from the monitoring means 12.1 which has detected that the conveyors 8a, 8b are not occupied. The first conveyor 1 is then arrested, the conveyors 8a and 8b are set in motion, the conveyor 1 receives a fresh group of stacks, and so forth.

The exact details of controls for the motors M.1 and M.8 can be similar to those disclosed in the patent to Aykut et al. except that the patent teaches to reduce the speed of the conveyors which form part of the gathering conveyor whereas the sections of the gathering conveyor 6 forming part of the apparatus of FIGS. 1 and 2 are simply lifted so that the upper reaches of the respective belt conveyors 8a-8b, 8c-8d and/or 8e-8f can contact and transport the stack or stacks 3 thereabove. Otherwise stated, the controls of the apparatus which is disclosed by Aykut et al. influence electromagnetic clutches whereas the controls of the apparatus of FIGS. 1-2 influence the movement of the section 8.1, 8.2 and/or 8.3 to a different level, namely to the upper level so that the respective section or sections of the gathering conveyor 6 can take over and advance the stack or stacks in the respective zone $A_1$, $A_2$ and/or $A_3$ of the gathering station.

The operative connections 9.1 to 9.3 can transmit torque without interruptions. However, it is equally within the purview of the invention to arrest the motor M.8 or to deactivate the connection 9.1, 9.2 and/or 9.3 whenever the respective moving means 11.1, 11.2 and/or 11.3 maintains the respective frame $F_1$, $F_2$ and/or $F_3$ in the lower position, i.e., when the respective section 8.1, 8.2 and/or 8.3 of the gathering conveyor 6 is not in contact with the stack or stacks 3 thereabove. The controls of the apparatus are simpler if the motor M.8 is on at all times, i.e., whenever the improved apparatus is in use.

As mentioned above, the motor M.8 can drive the belt conveyors 8a-8f continuously because these belt conveyors can be readily disengaged from or engaged with the lowermost sheets of the stacks 3 above them by the simple expedient of operating the respective moving means 11 in order to lower the respective frames $F_1$ to $F_3$ or to lift such frames with the respective pairs of belt conveyors. When the belt conveyors of the gathering conveyor 6 are lowered, they enable the belt conveyors 2a-2c of the first conveyor 1 to advance stacks 3 all the way to the receiving end of the singularizing conveyor 10.

Figure 3:
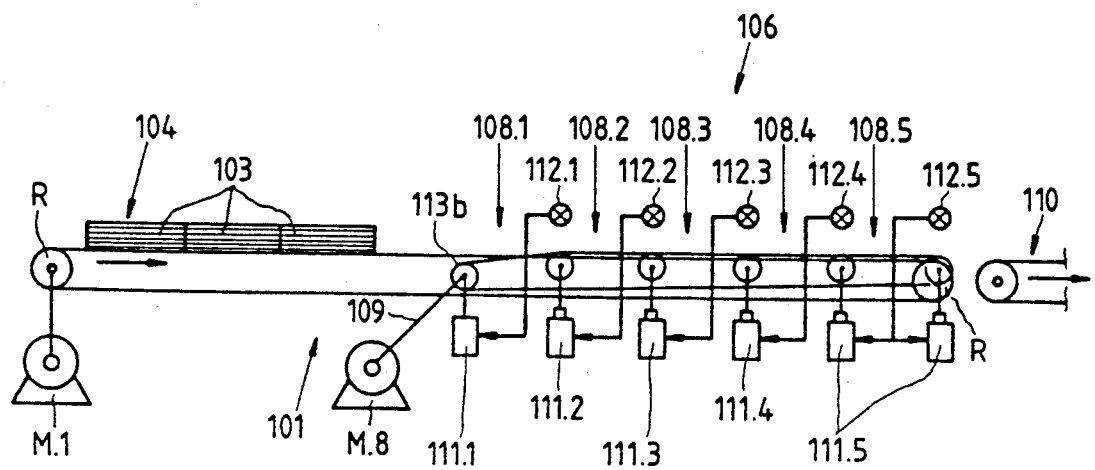
FIG. 3 is a fragmentary schematic side elevational view of a second apparatus wherein the sections of the gathering conveyor constitute portions of two endless belt conveyors.
Figure 4:
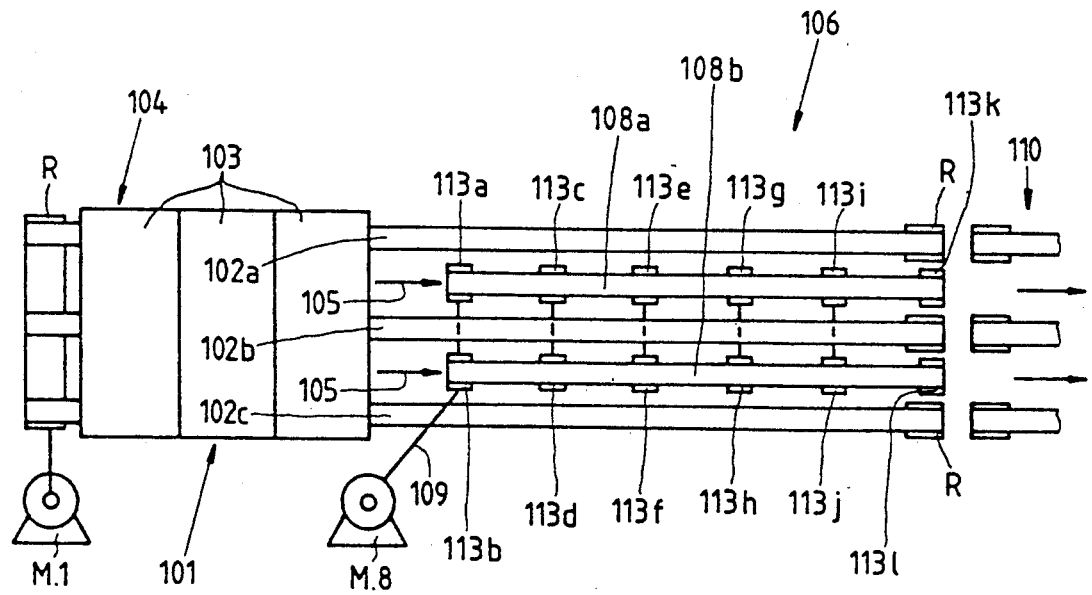
FIG. 4 is a plan view of the apparatus which is shown in FIG. 3.

FIGS. 3 and 4 show a modified apparatus wherein all such parts which are identical with the corresponding parts of the apparatus of FIGS. 1-2 are denoted by similar reference charactes and the parts which are analogous to those of the apparatus of FIGS. 1-2 are denoted by similar reference characters plus 100. The main difference is that the gathering conveyor 106 comprises two endless belt conveyors 108a, 108b and each of the five sections 108.1, 108.2, 108.3, 108.4, 108.5 the conveyor 106 comprises a portion of the belt conveyor 108a as well as a portion of the belt conveyor 108b. The means for moving the five sections 108.1 to 108.5 of the gathering conveyor 106 jointly with or independently of each other comprises five cylinder and piston units 111.1, 111.2, 111.3, 111.4, 111.5 (the unit 111.5 comprises two cylinders and two pistons) which respectively serve to move the pulleys 113a-113b, 113c-113d, 113e-113f, 113g-113h, 113i-113j and 113l between upper and lower levels. The level of upper reaches of the belt conveyors 102a, 102b, 102c which constitute the first conveyor 101 is fixed. A group 104, comprising three abutting stacks 103 of paper sheets, is shown on the left-hand portion of the first conveyor 101 upstream of the gathering station. The construction of the singularizing conveyor 110 is identical with or similar to that of the singularizing conveyor 10 of FIGS. 1-2. The motor M.1 drives the rear pulley R for the belt conveyors 102a-102c, and the motor M.8 drives the pulleys 113a-113l.

The moving means 111.1-111.5 for the aforediscussed sets of pulleys 113 are operated in response to signals from means 112.1, 112.2, 112.3, 112.4, 112.5 for monitoring the respective zones of the gathering station for occupancy or lack of occupancy by stacks 103. When the first conveyor 101 is in motion, the speed of its belt conveyors 102a-102c exceeds the speed of the belts 108a, 108b at the gathering station so that the group 104 which has been delivered onto the conveyor 101 can catch up with the preceding group on the gathering conveyor 106. The pulleys 113 of one or more groups of pulleys of the gathering conveyor 106 are raised if the thus raised section or sections are to take over the transport of stacks 3 toward the singularizing conveyor 110, and one or more sections of the gathering conveyor 106 are moved to their lower positions when such sections are to remain out of contact with the stacks 103 thereabove.

The apparatus of FIGS. 3–4 can comprise means (not shown) for compensating for rather small changes in positions of stacks 103 in response to raising or lowering of one or more sections of the gathering conveyor 106.

Figure 5:
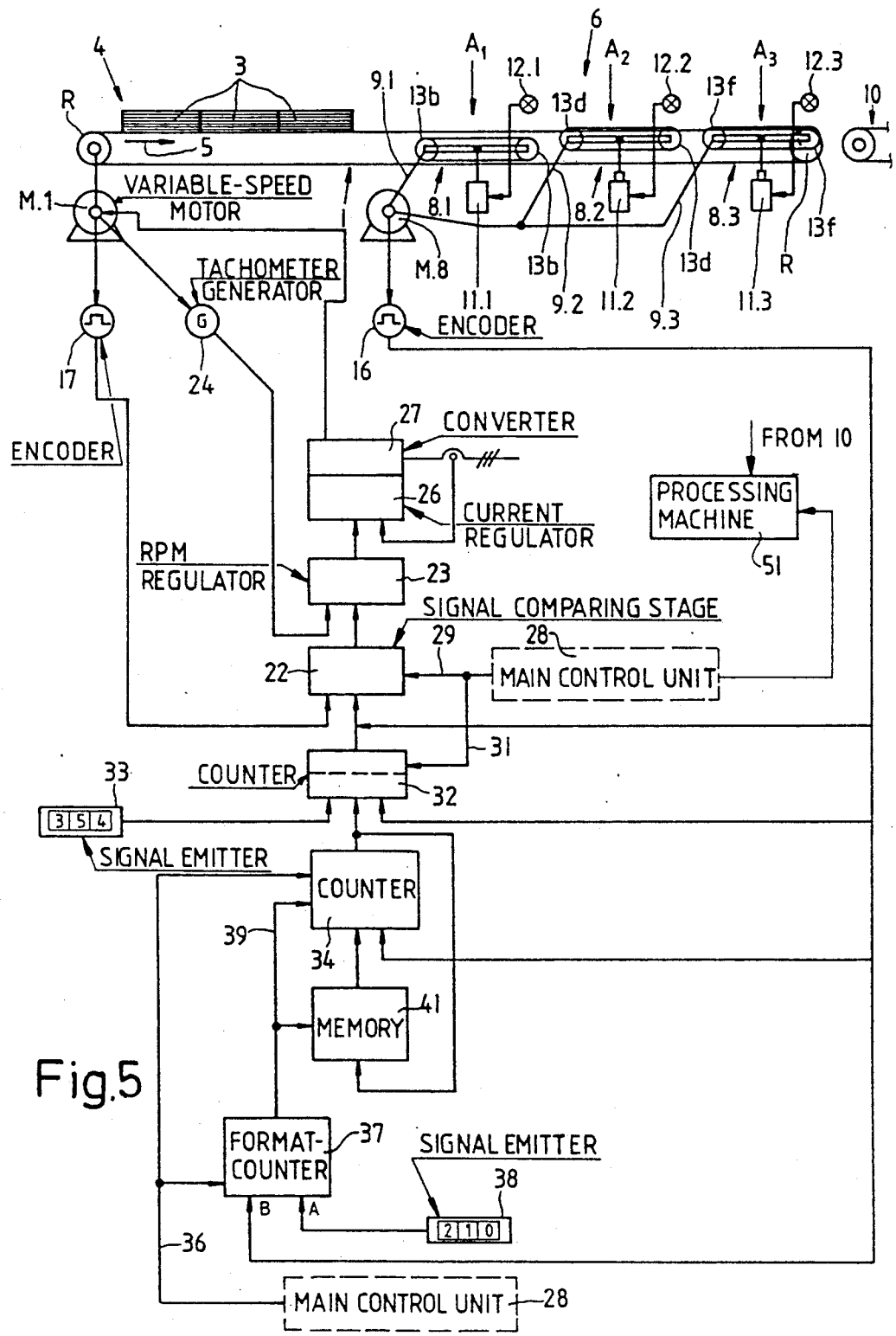
FIG. 5 is a fragmentary schematic elevational view of the apparatus of FIGS. 1 and 2, further showing modified means for operating the prime mover means for the first conveyor and the prime mover means for the gathering conveyor.

Referring to FIG. 5, there is shown an apparatus which includes conveyors 1, 6 and 10 corresponding to those of FIGS. 1 and 2 but has different means for regulating the operation of the motors M.1 (for the first conveyor 1) and M.8 (for the sections 8.1 to 8.3 of the conveyor 6). FIG. 5 further shows the processing machine 51 (e.g., a packing machine) which receives singularized stacks 3 from the conveyor 10 and whose operation is regulated by a main control unit 28 (indicated twice by broken-line boxes). The apparatus of FIG. 5 further comprises means for ensuring proper operation of the processing machine 51 even if certain groups 4 (which are delivered onto the first conveyor 1) contain less than the predetermined number of abutting stacks 3. This can happen if the machine or apparatus which accumulates stacks 3 or which assembles stacks 3 into groups 4 detects one or more defective stacks which are segregated from the adjacent stacks or groups prior to delivery to the first conveyor 1. The controls for the apparatus of FIG. 5 can ensure proper operation of the machine 51 even if the conveyor 1 fails to receive any groups 4 for a certain interval of time, i.e., if the number of missing stacks in a group matches the aforementioned predetermined number.

The motor M.8 is operatively connected with a first or master encoder 16 of the type disclosed in the patent to Reissmann et al., and the motor M.1 is operatively connected with a second or slave incremental encoder 17. The encoders 16 and 17 generate signals at frequencies which are respectively indicative of the speeds of the belt conveyors forming part of the sections 8.1 to 8.3 and of the speeds of the belt conveyors forming part of the first conveyor 1. The encoders 16, 17 are preferably digital (incremental) encoders. Signals which are generated by the encoder 16 are indicative of movement of a section of the gathering conveyor 6 through a predetermined distance, and signals which are generated by the encoder 17 are preferably indicative of movement of the belt conveyors of the first conveyor 1 through the same predetermined distance.

In order to achieve a desired speed ratio, i.e., to ensure that the speed of the first conveyor 1 will match or exceed the speed of the gathering conveyor 6, the controls of the apparatus including the encoders 16 and 17 of FIG. 5 are operated as follows:

It is assumed, at this time, that the first conveyor 1 invariably receives groups 4 of three abutting stacks 3 each, i.e., that there is no need for expulsion or segregation of defective stacks 3 ahead of the first conveyor.

The motor M.8 can constitute the main prime mover of the production line which includes the processing machine 51, the machine which assembles stacks 3, the machine which assembles stacks 3 into groups 4, and the apparatus of FIGS. 1-2. In order to ensure an optimum operation of the machine 51, it is necessary to reduce the distance or gap between successive groups 4 to zero while the leader of a next-following group is being transported by the belt conveyors of the first conveyor 1 and while the rearmost stack 3 of the preceding group 4 is located at the gathering station including the zones $A_1$, $A_2$ and $A_3$. It is assumed that the motor M.8 is on and drives the belt conveyors of the sections 8.1 to 8.3 at a constant speed. The motor M.8 further drives (either directly or indirectly) the first incremental encoder 16 so that the latter generates and transmits a series of first signals at a frequency which is proportional to the speed of the motor M.8 and hence to the speed of belt conveyors forming part of the sections 8.1 to 8.3.

Signals which are generated by the encoder 16 are transmitted to the corresponding input of a signal comparing stage 22 which constitutes a source of reference signals for a current rectifying module including an RPM regulator 23, a current regulator 26 and a cobverter 27 in the control circuit for the variable-speed motor M.1. Another input of the signal comparing stage 22 receives (second) signals from the encoder 17, and the output of the stage 22 transmits (third) signals to one input of the RPM regulator 23. Another input of the RPM regulator 23 receives signals from a tachometer generator 24 which is driven by the motor M.1 and the output signals of which denote the actual RPM of the motor M.1. When the motor M.1 is idle, the stage 22 receives signals only from the continuously driven encoder 16. The stage 22 is preferably provided with, or transmits digital signals to, a digital-analog converter (not specifically shown) which transmits analog signals to the corresponding input of the RPM regulator 23. The mode of operation of the RPM regulator 23 is well known, i.e., this regulator compares signals from the stage 22 with signals from the tachometer generator 24 and transmits to the current regulator 26 signals which cause the converter 27 to accelerate the motor M.1 until the intensity or another characteristic of signals from the tachometer generator 24 matches the intensity or another characteristic of reference signals from the stage 22. The tachometer generator 24 can constitute a permanently excited d-c motor the potential of which is proportional, within a wide range, to the RPM of the motor M.1. The circuits 26 and 27 determine the torque of the motor M.1.

The encoder 17 is started in response to starting of the motor M.1 and begins to transmit (second) signals at the corresponding frequency to the respective input of the stage 22. This causes the stage 22 to change the intensity or another characteristic of the output signal which is transmitted to the RPM regulator 23 because the intensity of the output signal (third signal) is a function of the difference between the frequencies of signals from the encoders 16 and 17. The arrangement is such that the speed of the motor M.1 suffices to accelerate the first conveyor 1 so that the speed of this conveyor exceeds the speed of belt conveyors forming part of the gathering conveyor 6, i.e., the freshly delivered group 4 approaches the preceding group. As can be seen in FIG. 2, the belt conveyors 2a-2c of the first conveyor 1 extend all the way to the front pulleys 13e, 13f for the belt conveyors 8e, 8f of the section 8.3. The latter supports the last stack 3 of the preceding group 4 and the belts 2a-2c advance the foremost stack 3 of the freshly received group 4 all the way into actual abutment with the rear edge face of the last stack.

In other words, the belt conveyors 8a-8d of the sections 8.1 and 8.2 cannot interfere with rapid advancement of stacks 3 which form the freshly received group 4 into abutment with the last stack 3 of the preceding group because such belt conveyors are held in their lower positions by the respective moving means 11..1 and 11.2 in response to appropriate signals from the monitoring means 12.1 and 12.2 (these monitoring means generate signals which denote that the zones $A_1$ and $A_2$ of the gathering station are not occupied by stacks 3). As the stacks 3 of the freshly received group 4 advance into the zones $A_1$ and $A_2$, the respective monitoring means 12.1 and 12.2 generate signals which cause the moving means 11.1 and 11.2 to raise the sections 8.1 and 8.2 so that, when the first conveyor 1 is arrested, the stacks 3 of the freshly delivered group 4 are advanced at the lesser speed of the belt conveyors forming part of the gathering conveyor 6.

The motor M.1 for the first conveyor 1 is arrested in response to a signal from the main control unit 28 as soon as the stacks 3 of the last-received group 4 are taken over by the groups 8.1 to 8.3 of the gathering conveyor 6. The motor M.1. receives a signal (29) from the main control unit 28 indirectly through the medium of the signal comparing stage 22 (the stage ceases to receive signals from the encoder 16). At the same time, the main control unit 28 transmits a start signal (31) to a counter 32 which begins to count (first) signals transmitted by the encoder 16 (the latter continues to transmit signals because the motor M.8 for the belts conveyors of the gathering conveyor 6 is on). The number of signals which are stored by the counter 32 during the interval of idleness of the belt conveyors 2a–2c of the first conveyor 1 is indicative of the distance which is covered by the sections 8.1 to 8.3 of the gathering conveyor 6 during such interval.

When the first conveyor 1 thereupon receives a fresh group 4 of stacks 3, the main control unit 28 ceases to transmit signals 31 and causes the stage 22 to again accept signals from the encoder 16. In addition, the stage 22 receives from the counter 32 a signal which is indicative of the distance covered by the sections 8.1 to 8.3 during the preceding interval of idleness of the conveyor 1, i.e., the signal from the counter 32 to the stage 22 denotes the distance between the leading end of the group 4 on the left-hand portion of the conveyor 1 and the trailing end of the last stack 3 of the preceding group 4 on the gathering conveyor 6. Still further, the stage 22 receives (by way of the counter 32) a signal from an emitter 33; such signal is indicative of the distance a (refer to the patent to Reissmann et al.) between the right-hand edge face of the fresly received group 4 on the conveyor 1 and the leftmost portion of the conveyor 6 or between such edge face and a wall 52 (refer again to Reissmann et al.) of the frame or housing of the production line. Signals from the emitter 33 are taken into consideration during each loading of the first conveyor 1.

Signals (including those from the emitter 33) which the stage 22 receives from the counter 32 cause the latter to transmit a reference signal of great intensity so that the variable-speed motor M.1 raises the speed of the first conveyor 1 accordingly. This is felt all the way to the right-hand ends of the belt conveyors 2a–2c. Therefore, the leading edge of the fresh group 4 is caused to advance all the way into abutment with the trailing edge of the last stack of the preceding group 4 on the section 8.1, 8.2 or 8.3 of the gathering conveyor 6. Such last stack of the preceding group 4 rests on a pair of belt conveyors 8a–8b or 8c–8d or 8e–8f whose upper reaches are kept at a level above the upper reaches of the belt conveyors 2a–2c by the respective moving means 11.1, 11.2 or 11.3 in response to signals from the associated monitoring means 12.1, 12.2 or 12.3.

The encoder 17 transmits signals at a high frequency whenever the conveyor 1 is driven by the motor M.1. When the number of such signals suffices to compensate for signals which were transmitted to the stage 22 by the counter 32, the width of the gap between the last stack 3 of the preceding group 4 and the foremost stack of the last group is reduced to zero and the conveyor 1 comes to a halt. The gathering conveyor 6 then advances the stacks of the resulting row at a predetermined speed into the range of the singularizing conveyor 10 which, in turn, spaces successive foremost stacks of the row apart for cyclical delivery to the inlet of the processing machine 51.

The control means of FIG. 5 further comprises means for ensuring that the processing machine 51 receives successive stacks 3 at required intervals even if the number of stacks 3 in a group 4 which is delivered onto the first conveyor 1 is less than three or even if one or more groups are missing in their entirety. As mentioned above, this can happen if the production line is provided with means for segregating defective stacks ahead of the first conveyor 1, e.g., at the station where individual sheets or sets of sheets are assembled into discrete stacks 3 or where the stacks 3 are assembled into groups 4. The means for ensuring proper operation of the processing machine 51 under such circumstances includes a counter 34 which receives signals from the encoder 16, from the main control unit 28 of the production line, from a format counter 37 and from an auxiliary counter (memory) 41. The counter 34 is started to receive signals from the encoder 16 in response to a signal 36 from the main control unit 28 whenever a stack 3 is being segregated ahead of the first conveyor 1. The counter 34 totalizes the signals from the encoder 16 so that the sum of such signals denotes the length of the gap in the corresponding group 4 (i.e., the difference between the effective length of an incomplete group 4 and the length of a complete group of three abutting stacks 3). The main control unit 28 starts the counter 34 simultaneously with the format counter 37 (note the signal 36). The mode of operation of the counters 34, 37, 41 and of a signal emitter 38 is identical with or analogous to the mode of operation of similarly referenced parts in the apparatus which is described in the patent to Reissmann et al. The signal from the emitter 38 is indicative of the selected or prescribed length of a stack 3 (as measured in the direction of travel of stacks along the path which is defined by the conveyors 1 and 10), and the counter 37 monitors the length of a stack. The input A of the counter 37 receives signals from the emitter 38 and the input B of the counter 37 receives signals from the encoder 16. When the input B receives a number of signals which corresponds to the length of a stack 3 (as determined by the signal from the emitter 38, i.e., when the intensity of signal at A matches that of signal at B), the output 39 of the counter 37 transmits signals to the counter 34 and to the counter (memory) 41. The signal from 39 erases in the counter 34 a number of signals (from 16) corresponding to the number of signals (from 16) that denotes the length of a stack 3, and the same information is stored in the counter 41 to be held in a position of readiness for the next cycle. The remaining signals which are stored in the counter 34 are transmitted to the counter 32 to be added to signals which the counter 32 receives from the emitter 33 and encoder 16. The purpose of the just described components is to ensure that the distance between the trailing edge of the last stack 3 on the gathering conveyor 6 and the leading edge of a freshly delivered incomplete group 4 on the belt conveyors 2a-2c of the first conveyor 1 is zero or one length or a while multiple of one full length of a stack 3 so that the processing machine 51 will operate properly even if it does not receive a stack 3 during a given cycle or during two or more successive cycles. The next stack 3 which enters the machine 51 is delivered thereto at an optimum time for processing (e.g., for wrapping). In other words, the width of gaps or spaces between certain stacks which are advanced by the singularizing conveyor 10 then exceeds the standard width; it can equal such standard width plus the length of a stack 3 so that the machine 51 will be capable of performing a series of operations as if wrapping a stack even though no stack is available for wrapping but the next series of operations will be performed on the next stack the same as if the preceding operation had involved the making of a wrapped stack.

An incremental encoder which can be used in the apparatus of FIG. 5 is described and shown in German Offenlegungsschrift No. 30 37 514 wherein the encoder is used to indicate the distances covered by corrugated paperboard. This prior publication also shows means for comparing signals which are generated by the encoder and means for regulating the speed of a motor in response to signals from the comparing means.

The apparatus which are shown in FIGS. 1-2 and 3-4 can compensate, to a certain extent, for irregularities in the delivery of groups of stacks to the first conveyor 1 or 101 and thence to the gathering station. However, and as described above, the apparatus of FIG. 5 can compensate for considerable or pronounced irregularities in the delivery of stacks, e.g., for the absence of one or more groups 4, without adversely affecting the operation of the processing machine 51. Such pronounced irregularities cannot be readily compensated by apparatus of FIGS. 1-2 or 3-4 because of limitations which are imposed upon the speeds of the conveyors 1, 7 or 101, 107. The controls of the apparatus which is shown in FIG. 5 are desirable if the processing machine 51 (such as a packing machine) is not adversely affected by the absence of a stack during an entire cycle but is adversely affected (or is likely to be adversely affected) by untimely delivery of a stack during a particular cycle. The control arrangement of FIG. 5 solves this problem by ensuring that, if a gap exists between the front edge of a freshly delivered group 4 and the trailing edge of the previously delivered group, the width of such gap equals the length of a stack or the combined length of two or more stacks. As mentioned above, this part of the control arrangement of FIG. 5 operates or can operate in a manner as disclosed in the patent to Reissmann et al.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. Apparatus for delivering discrete commodities to a processing machine, particularly for delivering spaced-apart stacks of paper sheets to a packing machine, comprising a first conveyor arranged to receive groups of commodities and to advance such groups in a predetermined direction along a predetermined path; first prime mover means for driving said first conveyor; a gathering conveyor occupying a portion of said path and arranged to convert the commodities into a row on normally closely adjacent and/or actually abutting commodities and to advance the row in said direction, said gathering conveyor having a plurality of sections disposed one behind the other in said direction, means for individually moving said sections between first positions at a first level in which the commodities in said portion of said path are carried by said first conveyor and are out of contact with said sections and second positions at a different second level in which the commodities in said portion of said path are disengaged from said first conveyor by and rest on the respective sections, and second prime mover means for driving said sections in said direction; and singularizing conveyor means arranged to receive successive commodities of the row from said gathering conveyor and to advance the received commodities in substantially uniformly spaced-apart positions toward the processing machine.

2. The apparatus of claim 1, wherein said second prime mover means comprise means for continuously driving said sections in said direction.

3. The apparatus of claim 1, wherein each of said sections includes at least one discrete conveyor.

4. The apparatus of claim 3, wherein said second prime mover means comprises means for continuously driving said discrete conveyors.

5. The apparatus of claim 1, wherein said gathering conveyor includes at least one endless belt or chain conveyor and said sections include portions of said endless conveyor.

6. The apparatus of claim 5, wherein said second prime mover means includes means for continuously driving said endless conveyor.

7. The apparatus of claim 1, wherein said second level is disposed above said first level.

8. The apparatus of claim 1, wherein said first conveyor comprises at least one first endless belt or chain conveyor and said gathering conveyor comprises at least one second endless belt or chain conveyor, said endless conveyors being disposed side by said as seen transversely of said direction.

9. The apparatus of claim 8, wherein said endless conveyors are narrow belt conveyors.

10. The apparatus of claim 8, wherein at least a portion of the endless conveyor of said gathering conveyor extends to a level slightly above the endless conveyor of said first conveyor in the second position of at least one of said sections.

11. The apparatus of claim 1, wherein said second prime mover means comprises a discrete prime mover for each of said sections, said discrete prime movers being operative to drive the respective sections in said direction in the second positions of said sections.

12. The apparatus of claim 11, wherein said discrete prime movers are operative to drive the respective sections in response to operation of the corresponding moving means to move the sections to their second positions.

13. The apparatus of claim 1, further comprising means for operating said moving means including signal generating means for monitoring the occupancy of said sections by commodities, said moving means being responsive to signals from said monitoring means to move the sections from second to first positions when the sections are not occupied by commodities.

14. The apparatus of claim 13, wherein said monitoring means includes optoelectronic detector means.

15. The apparatus of claim 1, wherein said first prime mover means comprises a variable-speed motor and further comprising first encoder means arranged to generate first signals at a first frequency which is proportional to the speed of said sections, second encoder means arranged to generate second signals at a second frequency which is proportional to the speed of said first conveyor, and control means for varying the speed of said motor as a function of differences between said first and second frequencies.

16. The apparatus of claim 15, wherein said first and second encoder means are operatively connected with said second and first prime mover means, respectively.

17. The apparatus of claim 15, wherein said control means includes means for comparing said first and second frequencies and for generating third signals denoting the difference between such frequencies.

18. The apparatus of claim 17, wherein said control means further comprises RPM regulator means responsive to said third signals and operative to vary the RPM of said motor.

19. The apparatus of claim 15, wherein said control means includes means for increasing the speed of said motor so as to move the foremost commodity of a group on said first conveyor toward said portion of said path and to locate the foremost commodity at a predetermined distance from the rearmost commodity of the previously received and advanced group, said distance being a whole multiple - including zero and one - of the length of a commodity in said direction.

20. The apparatus of claim 19, wherein each group normally comprises a predetermined number of commodities and further comprising means for monitoring the groups and for influencing said control means when the number of commodities in a group which is received by said first conveyor is less than said predetermined number so that said whole multiple equals the combined length of commodities which are missing from a group.

21. The apparatus of claim 20, wherein said monitoring means includes means for ascertaining the segregation of defective commodities ahead of said first conveyor.

22. The apparatus of claim 15, wherein each of said second signals is indicative of movement of said first conveyor through a predetermined distance and each of said first signals is indicative of movement of a section through said predetermined distance.

* * * * *